Sept. 10, 1946.   H. M. MARTIN   2,407,504
DYNAMOELECTRIC MACHINE
Filed Nov. 20, 1944

Inventor:
Harold M. Martin,
by Harry E. Dunham
His Attorney.

Patented Sept. 10, 1946

2,407,504

UNITED STATES PATENT OFFICE 2,407,504

DYNAMOELECTRIC MACHINE

Harold M. Martin, Schenectady, N. Y., assignor to General Electric Company, a corporation of New York Application November 20, 1944, Serial No. 564,220

3 Claims. (Cl. 188—104)

My invention relates to dynamoelectric machines and more particularly to an improved inductor eddy current type machine in which slots are formed in the air gap surfaces of both members.

An object of my invention is to provide an improved inductor type dynamoelectric machine.

Another object of my invention is to provide an improved inductor type dynamoelectric machine having longitudinally extending slots in the air gap surfaces of both members of the machine and to which a cooling liquid is supplied in the air gap of the machine.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
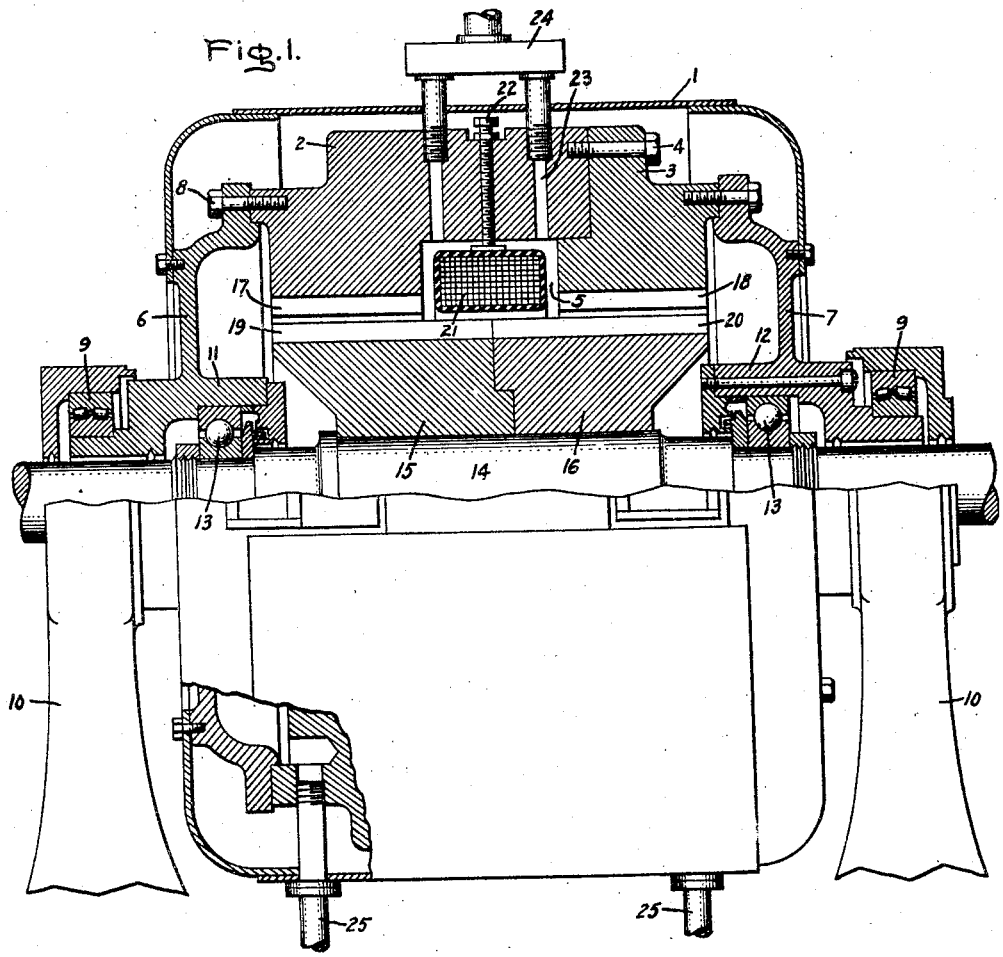
Figure 2:
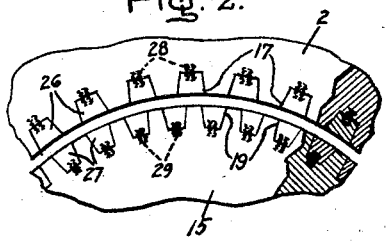
Figure 3:
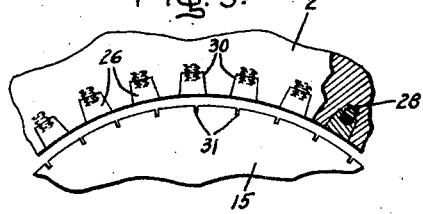

In the drawing, Fig. 1 is a side elevational view, partly broken away, of a dynamoelectric machine provided with an embodiment of my invention; Fig. 2 is a partial end view of the air gap surfaces of the two relatively rotatable members of a machine such as that shown in Fig. 1; and Fig. 3 is a partial end view of the air gap surfaces of the two relatively rotatable members of a machine such as that shown in Fig. 1 illustrating another arrangement of slots in the air gap surfaces of the machine.

Referring now to the drawing, I have shown an inductor eddy current type dynamoelectric machine which is adapted to be used as a dynamometer or brake which is provided with two substantially cylindrical members of magnetic material with an air gap therebetween. One of these two relatively rotatable members is formed as a substantially stationary member having an outer cover 1 arranged about a core of magnetic material formed of a pair of members 2 and 3 secured together in any suitable manner, as by a plurality of bolts 4, and formed on the inner periphery thereof with a recess 5 for receiving a field exciting winding. End shields 6 and 7 are secured to the core members 2 and 3 by a plurality of bolts 8 and are supported by suitable antifriction roller bearings 9 arranged in bearing housings in pedestals 10. These end shields 6 and 7 are formed with inwardly extending flanges 11 and 12 in which antifriction ball bearings 13 are mounted for supporting a shaft 14 on which the other rotatable member of the machine is mounted. This other rotatable member is shown in Fig. 1 as formed by a pair of interconnected core members 15 and 16 of magnetic material which are rigidly mounted on the shaft 14 in any suitable manner, as by being shrunk thereon, and all four core members 2, 3, 15, and 16 of the two relatively rotatable members are formed with longitudinally extending slots 17, 18, 19, and 20, respectively, in the air gap surfaces thereof. Excitation is provided to this machine by a field exciting winding 21 which is arranged in the recess 5 in the relatively stationary member and is supported in position by a plurality of adjustable clamping bolts 22 which extend through the core member 2.

With this construction, the slots in the two substantially cylindrical relatively rotatable members form teeth in both members which will produce flux changes in the teeth of the other member, thus generating eddy currents in both of the members. This will provide for the most efficient utilization of both members, as each will have substantially the same amount of electrical energy generated therein to be dissipated as heat. In order to remove this heat, I provide a plurality of passages 23 through the relatively stationary member which are connected to a cooling liquid supply header 24 for supplying cooling liquid, such as water, to the recess 5 around the field exciting winding 21 in order to cool the same and to provide for the supply of cooling liquid to the air gap between the two relatively rotatable members. The cooling liquid passes from the recess 5 axially through the air gap between the two relatively rotatable members and through the stator and rotor slots to both ends of the air gap in contact with the air gap surfaces of both members. This provides for the most efficient use of the cooling liquid, as it will absorb the heat energy from the air gap surfaces of both members. The water which is thus exhausted from the ends of the air gap passes into the two end shields to the lower portion of the stationary member and is exhausted therefrom through suitable drains 25.

It is desirable that torque pulsations should be minimized, and this may be obtained, as shown in Fig. 2, by providing a different number of teeth in one of the members from the number of teeth in the other member. Furthermore, in order to increase the capacity of the machine if it is to be used as a dynamometer or a brake, I provide fillers 26 and 27 of non-magnetic material in the slots which may be cast into the slots about a plurality of longitudinally spaced apart roughened inserts 28 and 29 formed as threaded studs secured in the bottom of the slots of the machine. These non-magnetic filler members may be used in both of the relatively rotatable members, as shown in Fig. 2, or may be provided, only in one of the members, as shown in Fig. 3, and do not in any way affect the flux distribution in the air gap and provide additional material in which eddy currents may be induced. In addition, these filler elements may be formed with the toothed surfaces of the two relatively rotatable members to provide a substantially smooth cylindrical air gap surface, thereby minimizing hydraulic drag on the machine which may result from the passage of cooling liquid through the air gap between the two members. In some instances, as shown in Fig. 3, it may be found desirable to form the slots 30 in one of the relatively rotatable members relatively wide or of the same dimension as is shown in Fig. 2, while the slots 31 in the other member are formed as relatively shallow and narrow slots. The member which is adapted to operate at the higher speed, such as the rotatable member if the machine is used as a brake or a dynamometer, preferably is the member in which the narrow slots 31 should be formed, as this provides a substantially continuous eddy current surface in the high speed member which, therefore, does not require the use of non-magnetic inserts in the slots, and minimizes the possibility of the dislocation or loosening of these inserts. In such a machine, the slots 30 of the other member may also be filled with non-magnetic material elements 26 similar to that shown in Fig. 2. This provides for a very efficient use of the magnetic material of both of the relatively rotatable members and for the most effective use of the cooling liquid which is passed axially in both directions through the air gap of the machine in contact with both magnetic members.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. An electrical machine having a pair of relatively rotatable members of magnetic material with an air gap therebetween, a plurality of slots in the magnetic material of both of said members adjacent said air gap, means including a field exciting winding for providing magnetic excitation to said magnetic material members and through said air gap, means substantially filling said slots with non-magnetic material for providing a substantially smooth surface to said relatively rotatable members adjacent said air gap, and means for supplying liquid to said air gap intermediate the ends thereof for cooling the air gap surfaces of said members.

2. An electrical machine having a relatively stationary cylindrical member of magnetic material and a relatively rotatable member of magnetic material with an air gap therebetween, a plurality of longitudinally extending relatively wide slots in the air gap surface of the magnetic material of said relatively stationary member, a plurality of longitudinally extending relatively narrow slots in the air gap surface of said relatively rotatable member different in number from those in said relatively stationary member, means including a field exciting winding for providing magnetic excitation to said magnetic material members and through said air gap, means substantially filling said slots with non-magnetic material for providing a substantially smooth surface to both of said relatively rotatable members adjacent said air gap, and means for supplying cooling liquid to said air gap intermediate the ends thereof for passage axially in both directions out of the ends of the air gap.

3. An electrical machine having a relatively stationary member of magnetic material and a relatively rotatable member of magnetic material with an air gap therebetween, a plurality of slots in the air gap surface of the magnetic material of said relatively stationary member, a plurality of slots in the air gap surface of said relatively rotatable member different in number from those in said relatively stationary member, means including a field exciting winding for providing magnetic excitation to said magnetic material members and through said air gap, means substantially filling said slots in said relatively rotatable member with non-magnetic material for providing a substantially smooth surface thereto adjacent said air gap, and means for supplying liquid to said air gap intermediate the ends thereof for cooling the air gap surfaces of said members.

HAROLD M. MARTIN.